United States Patent [19]

Kober et al.

[11] Patent Number: 5,356,463
[45] Date of Patent: Oct. 18, 1994

[54] FACADE PAINTS AND PARGETS HAVING HIGH EARLY WATER RESISTANCE

[75] Inventors: Hermann Kober, Bergisch Gladbach; Armand de Montigny, Leverkusen; Ottfried Schlak, Köln, all of Fed. Rep. of Germany

[73] Assignee: Bayer Aktiengesellschaft, Leverkusen, Fed. Rep. of Germany

[21] Appl. No.: 983,911

[22] Filed: Dec. 1, 1992

[30] Foreign Application Priority Data

Dec. 11, 1991 [DE] Fed. Rep. of Germany ....... 4140733

[51] Int. Cl.$^5$ .............................................. C08G 77/04
[52] U.S. Cl. .................................... 106/2; 106/287.1; 106/287.12; 106/490
[58] Field of Search ................ 106/287.1, 287.12, 490, 106/2

[56] References Cited

U.S. PATENT DOCUMENTS

| | | | |
|---|---|---|---|
| 2,877,201 | 3/1959 | Bonza et al. | 106/287.1 |
| 3,372,052 | 3/1968 | Polniaszek | 106/287.1 |
| 3,574,651 | 4/1971 | Nitzsche et al. | 106/287.1 |
| 3,976,497 | 8/1976 | Clark | 106/287.12 |
| 4,209,432 | 6/1980 | Roth | 106/287.12 |
| 4,267,297 | 5/1981 | Hanada et al. | 528/18 |
| 4,677,160 | 6/1987 | Kondo et al. | 524/860 |
| 4,769,405 | 9/1988 | Kondo et al. | 524/35 |
| 4,846,886 | 7/1989 | Fey et al. | 106/287.1 |
| 5,073,195 | 12/1991 | Cuthbert et al. | 106/287.12 |
| 5,112,393 | 5/1992 | Engel et al. | 106/287.12 |

FOREIGN PATENT DOCUMENTS 287085 10/1988 European Pat. Off. .
618462 7/1980 Switzerland .

*Primary Examiner*—Mark L. Bell
*Assistant Examiner*—Scott L. Hertzog
*Attorney, Agent, or Firm*—Sprung Horn Kramer & Woods

[57] ABSTRACT

The invention relates to a process for the production of paints and pargets having high early water resistance and comprising inorganic fillers, pigments, silicone resin, and a polymeric binder wherein a) the inorganic fillers and pigments are initially dispersed in at least 80% by weight of the total quantity of water required to disperse the inorganic fillers and pigments in the presence of pigment wetting aids, b) silicone resin having a viscosity of 2 to 10,000 mPa.s is subsequently dispersed in the absence of emulsifiers in the dispersion obtained in a) and, c) after step b), the polymeric binder is added in the form of an aqueous dispersion.

4 Claims, No Drawings

FACADE PAINTS AND PARGETS HAVING HIGH EARLY WATER RESISTANCE

This invention relates to facade paints and pargets having high early water resistance. The facade paints and pargets according to the invention belong to the class in which the content of organic resins does not exceed the content of organopolysiloxanes (see, for example, DE-B 1 284 007).

Facade paints and pargets generally contain 45 to 60% by weight inorganic solids, 10 to 20% by weight silicone, an organic polymer dispersion in a quantity of 2/5ths to 4/5ths of the silicone content, 20 to 25 parts by weight water and small quantities of dispersants, wetting agents and thickeners.

The silicone is normally introduced into the mixture in the form of an aqueous dispersion prepared using emulsifiers. The silicone is introduced first and the inorganic constituents are dispersed in the mixture thereafter.

After their application, paints and pargets of the type in question remain fairly absorbent to water for a certain time ("wash-out period") which limits their early resistance to weathering influences (rain).

The problem addressed by the present invention was to provide facade paints and pargets of the type mentioned at the beginning which would show high early water resistance, i.e. would not have the initial wash-out period.

It has now been found that the problem addressed by the present invention can be solved if the facade paints and pargets are produced substantially free from emulsifiers. Surprisingly, this can be done without significantly affecting other crucial properties of the facade paints and pargets, including their dilutability with water, their long-term stability in storage, etc.

Accordingly, the present invention relates to a process for the production of paints and pargets having high early water resistance which is characterized in that a) the inorganic constituents are initially dispersed in at least 80% by weight of the total quantity of water used in the presence of pigment wetting aids,
b) silicone resins are subsequently dispersed in the absence of emulsifiers in the dispersion obtained in a), the silicone resins being dilutable with at most small quantities of organic solvents to establish the requisite viscosity and
c) finally, the organic polymer is added in the form of an aqueous dispersion.

The present invention also relates to emulsifier-free paints and pargets containing 5 to 50% by weight silicone resins.

Suitable pigment wetting agents according to the invention are sodium polyphosphate or hexametaphosphate, which are preferably used in the form of aqueous solutions, or surface-active agents having a high affinity for the solid surfaces of the inorganic particles, such as salts of polyacrylic acid PVA or cellulose-based protective colloids. Use in small quantities (of the pigment wetting aids) means that the pigment wetting aids are used in at most such a quantity that they are completely absorbed by the solid surface of the inorganic particles and the dispersion medium (water) contains virtually no more free molecules of pigment wetting aid after dispersion of the inorganic particles.

According to the invention, the inorganic components used are the typical inorganic constituents of paints and pargets such as fillers for example, talc, calcium carbonate inorganic pigments, such as titanium dioxide, iron oxides, etc.

The pigment wetting aids are preferably introduced into water and the inorganic constituents are dispersed therein. The pigment wetting aid is preferably used in quantities below 1% by weight and, more preferably, in quantities of 0.4 to 0.8% by weight, based on the water.

According to the invention, the silicones used are organopolysiloxanes or silicone resins which have a viscosity of 2 to 10,000 mPa.s and preferably 20 to 5,000 mPa.s, optionally after the addition of small quantities of solvent, and a composition corresponding to the following general structure:

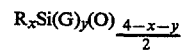

$$R_xSi(G)_y(O)_{\frac{4-x-y}{2}}$$

where R is an aliphatic, aromatic, saturated or unsaturated, optionally halogen- or cyano-substituted, monofunctional hydrocarbon radical containing up to 18 carbon atoms, at least 80% methyl radicals preferably being present, and G is a hydrogen atom, an OH group and/or a hydrolyzable radical, with the proviso that the radical eliminated by hydrolysis does not adversely affect the property spectrum of the facade paint or parget, x has a value of $0.75 \leq x \leq 2$ and
y has a value of $0 \leq y \leq 2$.

Examples of permitted products releasable by hydrolysis are alcohols, amines, low molecular weight carboxylic acids, oximes, etc. Preferred hydrolyzable radicals are Si(OR)- or most preferably $SiOC_2H_5$-groups.

According to the invention, it is also possible to use silicone resins of relatively high viscosity providing they are adapted in their viscosity by mixing with small quantities of solvents, such isoparaffin, solvent naphtha (for example Shellsol A).

According to the invention, it is crucial that the silicones are added free from emulsifiers and, in particular, not predispersed in water to the dispersions already containing the inorganic constituents. Dispersion is carried out in the usual way by means of high-speed stirrers.

The organic polymer is a binder that is typically used in known paints and pargets. The polymeric binders are normally added as the aqueous dispersion of the organic polymer. Organic polymers useful as binders are well known in the aft. An example of such binders is styrene/acrylate copolymer.

Finally, a small quantity of a thickener, for example 1.5 to 3%, based on the dispersion as a whole, of a solution, for example a 2.5% solution, of cellulose ether derivatives, for example hydroxyethyl cellulose, in water, may optionally be added to establish viscosity.

The invention is illustrated by the following Examples. These Examples are intended to illustrate the invention and are not intended to limit the scope of the invention in any manner.

EXAMPLE

A. Production of paints and pargets according to the invention

Emulsion paints are produced using a dissolver. To this end, water is introduced into the mixing vessel in a quantity corresponding to the formulation. The pigment wetting aids are then added. The fillers and pigments are subsequently introduced and predispersed for about 5 minutes.

After the pigment and filler agglomerates have been size-reduced, the silicone is added in accordance with the invention and dispersed with the mixture as a whole for another 5 minutes. In a final step, a polymer dispersion is added and homogeneously dispersed by stirring for 1 minute.

If necessary, the silicone emulsion paint produced in this way is subsequently adjusted to the consistency required for application using typical thickeners, such as cellulose ether derivatives, hydroxyethyl cellulose, etc.

Emulsion pargets are produced by a comparable process. In their case, too, the organopolysiloxane is added to the predispersed fillers and pigments. However, the addition of relatively coarse quartz sand is only made after the dispersion process.

B. Formulations

The following compositions are used in the following Examples:

| Formulation I: | |
| --- | --- |
| 210.7 parts by weight | water |
| 8.4 parts by weight | sodium polyphosphate solution (10% in $H_2O$) |
| 1.4 parts by weight | pigment wetting aid (based on polyacrylic acid) |
| 70.2 parts by weight | talcum (particle size 20 $\mu$m) |
| 70.2 parts by weight | precipitated calcium carbonate (average particle size 0.3 $\mu$m) |
| 140.4 parts by weight | calcium carbonate (filler calcite type, average particle size 5 $\mu$m) |
| 140.4 parts by weight | calcium carbonate (filler calcite type, average particle size 15 $\mu$m) |
| 140.4 parts by weight | titanium dioxide, rutile type |
| 140.4 parts by weight | silicone product according to the invention |
| 56.2 parts by weight | dispersion of styrene/acrylate polymer, 50% in $H_2O$ (polymer dispersion) |
| 21.3 parts by weight | thickener (hydroxyethyl cellulose, 2.5% solution in $H_2O$) |
| 1000 parts by weight | |
| Formulation II | |
| 203.4 parts by weight | water |
| 6.4 parts by weight | sodium polyphosphate solution (10% in $H_2O$) |
| 1.1 part by weight | pigment wetting aid (see form. I) |
| 105.9 parts by weight | talcum (see form. I) |
| 105.9 parts by weight | calcium carbonate, precipitated (see form. I) |
| 264.8 parts by weight | calcium carbonate, calcite type (5 to 15 $\mu$m) |
| 105.9 parts by weight | titanium dioxide, rutile type |
| 105.9 parts by weight | silicone product according to the invention |
| 84.8 parts by weight | dispersion of styrene/acrylate polymer (see form. I) |
| 15.9 parts by weight | thickener (see form. I) |
| 1000 parts by weight | |

C. Testing

Facade paints produced as described above from the ingredients listed above are tested for their water absorption. This is done by measuring the suction effect of a building material or that of the building material/coating system.

Measurement of the capillary water absorption is described in DIN 52 617. The method in question is carried out as an accelerated test in accordance with the above specification.

The paint is applied to lime-sandstone test specimens (115×70×20 mm; surface area 0.008 $m^2$).

In the coating of the substrates, a quantity of 6.5 g is applied to the surface as the first coat and uniformly distributed thereon using a flat brush, the sides also being coated.

A second coat is applied within 24 hours. The quantity of paint applied amounts to 4.5 g.

The coated test specimens are stored for 24 hours at room temperature and for 24 hours at 50° C. They are then further conditioned by storage for another 24 hours at room temperature.

The test specimens thus prepared are then placed in foam-lined trays filled with water in such a way that the coated surface is in permanent contact with the water-saturated foam surface.

The increase in weight is measured as a function of time (after 2, 6 and 24 hours) and compared with that of the untreated test specimen.

EXAMPLE 1

Reference Example

An untreated test specimen is stored in water under the test conditions described above.

| Storage time | Water absorption [kg/$m^2$] |
| --- | --- |
| 2 | 2.98 |
| 6 | 3.01 |
| 24 | 3.1 |

EXAMPLE 2

Comparison Example

A paint is produced in accordance with formulation I by initially dispersing a silicone resin having the composition $(CH_3)_{1.2}Si(O)_{1.38}(OH)_{0.04}$, of which the viscosity has been adjusted to 2050 mPa.s (23° C.) by addition of 45 parts by weight solvent naphtha, in water using 8.4 parts by weight of a polyethylene oxide alkylamine as emulsifier. The inorganic constituents, etc. are then dispersed.

| Storage time | Water absorption [kg/$m^2$] |
| --- | --- |
| 2 | 0.40 |
| 6 | 2.90 |
| 24 | 3.10 |

The test specimen was then stored a second time with the following results:

| Storage time | Water absorption [kg/$m^2$] |
| --- | --- |
| 2 | 0.10 |
| 8 | 0.25 |
| 24 | 0.50 |

EXAMPLE 3

A test specimen coated with a facade paint produced in accordance with the invention (formulation I) using a silicone product having a viscosity of 114.5 mPa.s and the following average composition:

$[CH_3SiO_{3/2}]_{30}[(CH_3)_2SiO]_{400}[C_2H_5O_{\frac{1}{2}}]_{32}$ showed the following results after storage in water:

| Storage time (h) | Water absorption [kg/m$^2$] |
|---|---|
| 2 | 0.11 |
| 6 | 0.21 |
| 24 | 0.34 |

EXAMPLE 4

A paint which had been produced in accordance with the invention (formulation I) using a silicone product having a viscosity of 90 mPa.s and the following average composition:

$(CH_3)_{0.8}(C_{12}H_{25})_{0.2}Si(O)_1(OCH_3)_1$ and stabilized with 1% hexamethyl disilazane had the following effect on the described test specimens:

| Storage time (h) | Water absorption [kg/m$^2$] |
|---|---|
| 2 | 0.12 |
| 6 | 0.28 |
| 24 | 0.86 |

EXAMPLE 5

A paint was formulated in accordance with formulation I, the ratio of organopolysiloxane (from Example 3) to polymer binder being changed from 83.3:16.7% by weight to 73:27% by weight. Testing produced the following results:

| Storage time (h) | Water absorption [kg/m$^2$] |
|---|---|
| 2 | 0.23 |
| 8 | 0.41 |
| 24 | 0.60 |

Viscosity of the paint before application:

| | |
|---|---|
| immediately | 1300 mPas |
| after 2 weeks | 1300 mPas |
| after 8 weeks | 1450 mPas |

EXAMPLE 6

Paints A, B and C based on formulation II with the following products according to the invention as silicone component:

a: $[CH_3SiO_{3/2}]_{50}[(CH_3)_2SiO]_{1000}[C_2H_5O_{\frac{1}{2}}]_{52}$ (viscosity: 176.8 mPa.s)

b: $[CH_3SiO_{3/2}]_{30}[(CH_3)_2SiO]_{400}[C_2H_5O_{\frac{1}{2}}]_{32}$ (viscosity: 114.5 mPa.s)

c: $[CH_3SiO_{3/2}]_{30}[(CH_3)_2SiO]_{200}[C_2H_5O_{\frac{1}{2}}]_{32}$ (viscosity: 32.1 mPa.s)

showed the following results on the test specimens:

| | A | B | C |
|---|---|---|---|
| Storage time [h] | Water absorption [kg/m$^2$] | | |
| 2 | 0.11 | 0.12 | 0.14 |
| 6 | 0.22 | 0.22 | 0.24 |
| 24 | 0.34 | 0.33 | 0.36 |
| Storage time [weeks] of the paint before application T: approx. 25° C. | Viscosity [mPas] | | |
| 0 | 1800 | 1200 | 1000 |
| 7 | 1800 | 1250 | 1050 |

EXAMPLE 7

A paint based on formulation II containing an 80% solution of a resin having the following average composition:

$(CH_3)_{\frac{1}{2}}Si(O)_{1.38}(OH)_{0.04}$ in Shellsol A as silicone component showed the following results after storage in water:

| Storage time [h] | Water absorption [kg/m$^2$] |
|---|---|
| 1 | 0.04 |
| 8 | 0.13 |
| 24 | 0.46 |

We claim:

1. A process for the production of paints and pargets which have high early water resistance and are free of emulsifiers and comprise:
   a) 45 to 60% by weight of inorganic solids selected from inorganic fillers and pigments,
   b) 5 to 50% by weight of a silicone resin,
   c) an organic polymeric binder in an amount free from the silicone content, and
   d) water which comprises the steps of:
   1) initially dispersing the organic fillers and pigments in at least 80% by weight of the total quantity of water required to disperse the inorganic fillers and pigments in the presence of pigment wetting aids;
   2) subsequently dispersing the silicone resin in the absence of emulsifiers as found in step 1) and
   3) then adding the polymeric binders in the form of an aqueous dispersion.

2. An emulsifier-free paint or parget containing a silicone resin having a viscosity of 2 to 10,000 Pa.s made by the process according to claim 1.

3. A process according to claim 1, wherein the silicone resin has a viscosity of 20 to 5,000 mPa.s.

4. A process according to claim 1, wherein the polymeric binder is a styrene/acrylate copolymer.

* * * * *